(12) United States Patent
Volcansek

(10) Patent No.: US 10,274,064 B2
(45) Date of Patent: Apr. 30, 2019

(54) COVER ASSEMBLY FOR A TORQUE CONVERTER INCLUDING DRIVE PLATE HAVING ELASTIC PRELOADING ELEMENT

(71) Applicant: Schaeffler Technologies GmbH & Co. KG, Herzogenaurach (DE)

(72) Inventor: John Volcansek, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1106 days.

(21) Appl. No.: 14/451,910

(22) Filed: Aug. 5, 2014

(65) Prior Publication Data

US 2015/0040550 A1 Feb. 12, 2015

Related U.S. Application Data

(60) Provisional application No. 61/862,707, filed on Aug. 6, 2013.

(51) Int. Cl.
| | | |
|---|---|---|
| *F16C 11/04* | (2006.01) | |
| *F16H 41/24* | (2006.01) | |
| *B23P 11/00* | (2006.01) | |

(52) U.S. Cl.
CPC ............. *F16H 41/24* (2013.01); *B23P 11/00* (2013.01); *Y10T 29/49863* (2015.01)

(58) Field of Classification Search
CPC .... B23P 11/00; F16H 41/24; Y10T 29/49863; F16D 3/77; F16F 15/12
USPC ...... 403/220, 225, 226, 227; 464/98, 81, 84; 494/84, 94, 200
See application file for complete search history.

(56) References Cited

U.S. PATENT DOCUMENTS

| | | | | |
|---|---|---|---|---|
| 2,287,630 | A * | 6/1942 | Miller ..................... | F16D 13/71 192/111.15 |
| 5,771,998 | A * | 6/1998 | Olsen ...................... | F16H 45/02 192/103 F |
| 5,868,624 | A * | 2/1999 | Fukushima ............... | F16D 3/77 192/200 |
| 6,119,549 | A * | 9/2000 | Yamamoto .............. | F16F 7/104 29/894 |
| 7,011,196 | B2 | 3/2006 | Sudau | |
| 7,931,419 | B2 * | 4/2011 | Skrabs ..................... | F16D 1/112 403/242 |
| 8,206,036 | B2 * | 6/2012 | Kuwabara ............. | F16C 29/065 384/15 |
| 8,677,598 | B2 * | 3/2014 | Lindemann ............. | F16H 45/02 192/200 |

(Continued)

FOREIGN PATENT DOCUMENTS

JP  200301176 A1 * 1/2003 ............. B60R 21/20

*Primary Examiner* — Amber R Anderson
*Assistant Examiner* — Nahid Amiri
(74) *Attorney, Agent, or Firm* — Davidson, Davidson & Kappel, LLC

(57) ABSTRACT

A cover assembly for a torque converter includes a front cover and a drive plate connected to an outer surface of the front cover for coupling to the front cover to an engine crankshaft. The drive plate includes elastic preloading elements pressing against the outer surface of the front cover. A method of forming a cover assembly for a torque converter includes fixing a drive plate to an outer surface of a front cover of the torque converter such that elastic preloading elements of the drive plate press against the outer surface and are compressed.

15 Claims, 2 Drawing Sheets

(56) References Cited

U.S. PATENT DOCUMENTS

| | | | | |
|---|---|---|---|---|
| 8,746,425 B2* | 6/2014 | Kawahara | ......... | F16F 15/12366 |
| | | | | 192/213.1 |
| 8,752,685 B2* | 6/2014 | Tomiyama | ................ | F16D 3/14 |
| | | | | 192/213 |
| 8,881,515 B2* | 11/2014 | Lindemann | ......... | F16F 15/1343 |
| | | | | 60/338 |
| 9,079,274 B2* | 7/2015 | Lubera | .................... | F16B 37/02 |
| 9,080,541 B2* | 7/2015 | Frey | ....................... | B21D 22/20 |
| 9,212,705 B2* | 12/2015 | Vanni | ...................... | F16D 33/18 |
| 2009/0311040 A1* | 12/2009 | Zuehl | ..................... | F16H 41/24 |
| | | | | 403/337 |
| 2014/0034436 A1* | 2/2014 | Aoki | ....................... | F16H 45/02 |
| | | | | 192/3.29 |
| 2014/0238806 A1* | 8/2014 | Burky, Jr. | ............... | F16H 41/24 |
| | | | | 192/3.28 |
| 2015/0008086 A1* | 1/2015 | Mototsune | ............. | F16H 45/02 |
| | | | | 192/3.29 |
| 2015/0369563 A1* | 12/2015 | Pellegrini | ............ | F41C 33/045 |
| | | | | 224/665 |

* cited by examiner

COVER ASSEMBLY FOR A TORQUE CONVERTER INCLUDING DRIVE PLATE HAVING ELASTIC PRELOADING ELEMENT

This claims the benefit to U.S. Provisional Patent Application No. 61/862,707, filed on Aug. 6, 2013, which is hereby incorporated by reference herein.

The present disclosure relates generally to torque converters and more specifically to cover assemblies for torque converters.

BACKGROUND

U.S. Pat. No. 7,011,196 discloses a torque converter having a drive plate welded to a front cover at two radial locations.

SUMMARY OF THE INVENTION

A cover assembly for a torque converter is provided. The cover assembly includes a front cover and a drive plate connected to an outer surface of the front cover for coupling to the front cover to an engine crankshaft. The drive plate includes elastic preloading elements pressing against the outer surface of the front cover.

Embodiments of the cover assembly may also include one or more of the following advantageous features:

Each elastic preloading element may be formed in an interior of the drive plate. The elastic preloading elements may be formed by tabs formed into the interior of the drive plate and bent toward the front cover. The tabs may extend radially away from a center axis of the drive plate. The drive plate may include radial protrusions at an outer circumference thereof and the tabs may extend into the radial protrusions. The drive plate may be connected to the front cover by rivets. The rivets may be extruded from the front cover through holes in the drive plate. The elastic preloading elements may be radially outside of the rivets.

A method of forming a cover assembly is also provided. The method includes fixing a drive plate to an outer surface of a front cover of the torque converter such that elastic preloading elements of the drive plate press against the outer surface and are compressed.

Embodiments of the method may also include one or more of the following advantageous features:

The method may further include forming the elastic preloading elements within an interior of the drive plate. The forming the elastic preloading elements may include forming slots in the interior of the drive plate to form tabs and bending the tabs away from the interior of the drive plate. The drive plate may include radial protrusions at an outer circumference thereof and the slots may be formed to extend into the radial protrusions. The fixing the drive plate to the front cover may include riveting the drive plate to the front cover. The riveting the drive plate to front cover may include extruding the front cover through holes in the drive plate.

BRIEF DESCRIPTION OF THE DRAWINGS

The present invention is described below by reference to the following drawings, in which.

DETAILED DESCRIPTION

Embodiments of the present disclosure show a drive plate that is preloaded by elastic preloading elements when the drive plate is fixed to the front cover of a torque converter by for example riveting or welding. The elastic preloading element may limit the cyclic loading at the connection between the drive plate and the front cover (i.e., for example at the weld or rivets) to mostly when in compression.

Figure 1:
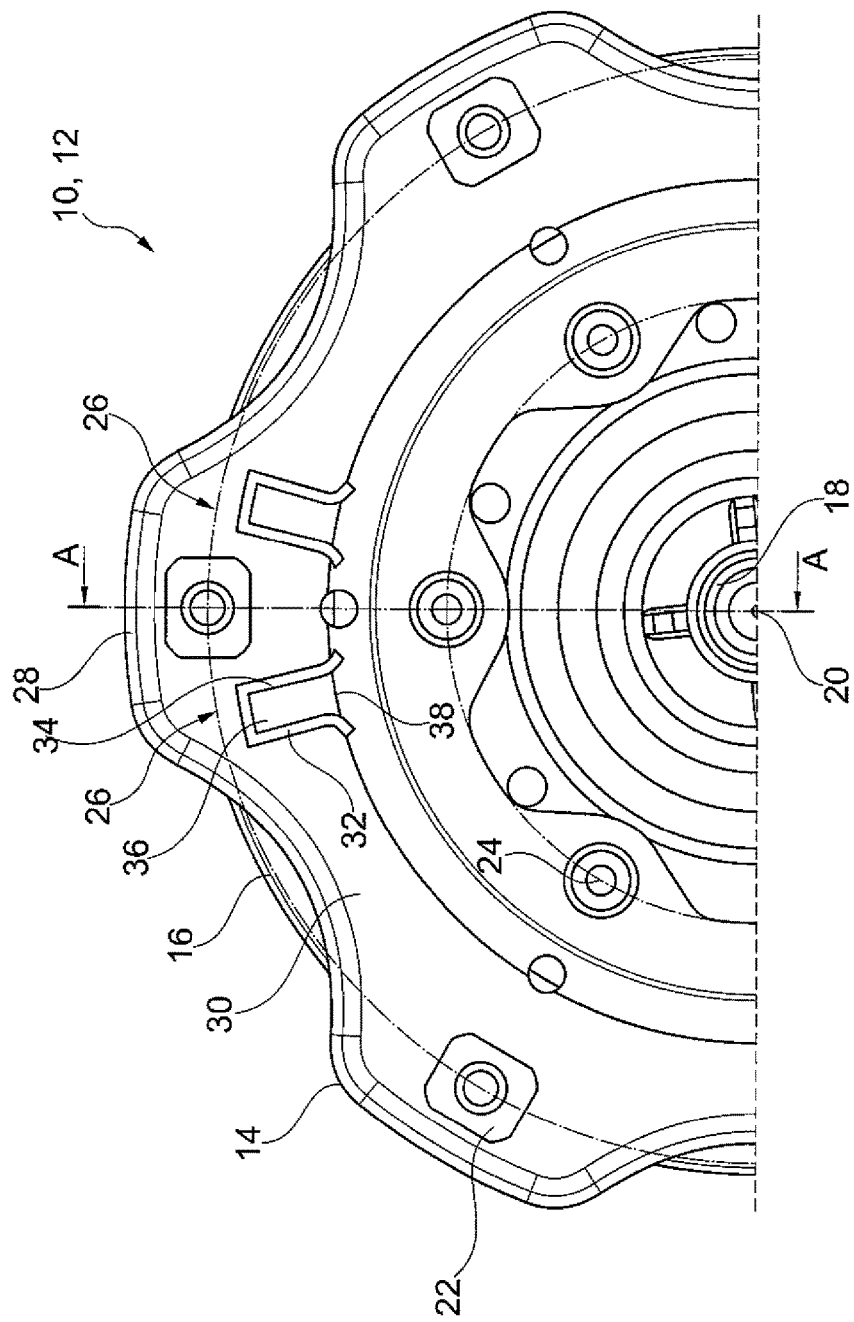
FIG. 1 shows a half plan view of a cover assembly of a torque converter in accordance with an embodiment of the present invention.

FIG. 1 shows a half plan view of a cover assembly 10 of a torque converter 12 in accordance with an embodiment of the present invention. Cover assembly 10 includes a drive plate 14, a front cover 16 and a pilot 18. Cover assembly 10 is connectable to a crankshaft of an internal combustion engine via pilot 18 at a center axis 20 and lugs 22 circumferentially spaced about center axis 20 that are fixed to drive plate 14. Front cover 16 is connectable to a rear cover is form a housing, which may house a lockup clutch, a damper, a turbine, an impeller and a shaft for connecting to a variable speed transmission. Drive plate 14 and front cover 16 are fixed together by a plurality of rivets 24 spaced circumferentially about center axis 20.

In order to preload drive plate 14 when drive plate 14 is fixed to front cover 16, drive plate 14 includes a plurality of elastic preloading elements 26 circumferentially spaced about center axis 20. FIG. 1 shows two preloading elements circumferentially aligned with one of radial protrusions 28, which extend radially outward at an outer circumference of drive plate 14. While only two elastic preloading elements 26 are shown in FIG. 1, preferred embodiments of the present invention include more than two preloading elements. For example, drive plate 14 may include two elastic preloading elements 26 circumferentially aligned with each of radial protrusions 28, such that drive plate 14, which include six radial protrusions 28, includes twelve elastic preloading elements 26.

In this embodiment, elastic preloading elements 26 are formed in an interior 30 of drive plate 14. Drive plate 14 is formed by a metal plate processed to remove material therefrom to form slots 32 that define preload tabs 34 in drive plate 14 and provide preload tabs 34 with a flexible geometry. Preload tabs 34 each include a free end 36 connected to interior 30 of drive tab 14 by a base end 38. A radially extending portion of each preload tab 34 extends radially from base end 38 away from center axis 20 such that each preload tab 34 is substantially finger-shaped. As shown in FIG. 1, tabs 34 extend into radial protrusions 28 on opposite sides of the respective lug 22 in radial protrusion 28. Drive plate 14 and front cover 16 are arranged such that radial protrusions 28 extend radially outward past an outer circumference of front cover 16 and lugs 22 are centered along the outer circumference of front cover 16.

Figure 2:
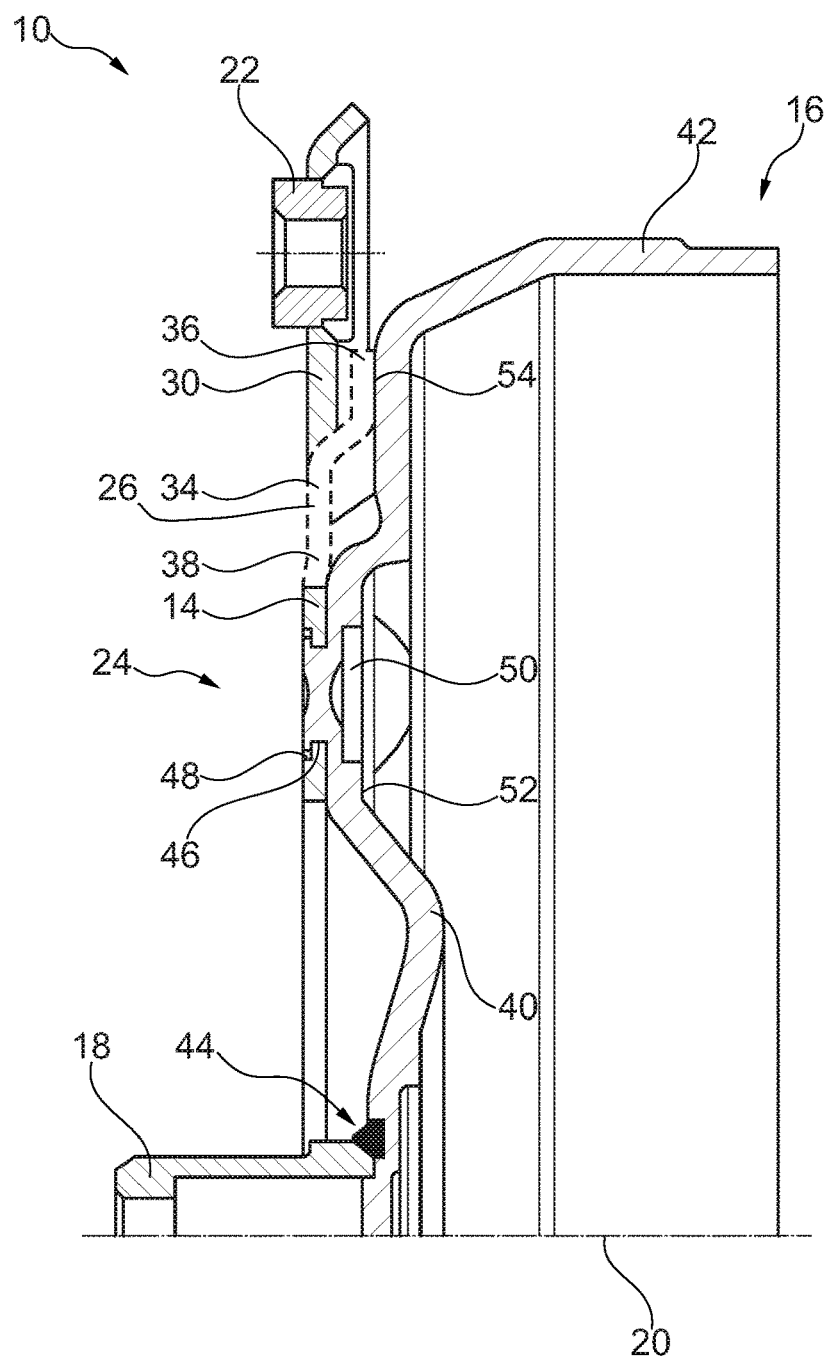
FIG. 2 shows a cross-sectional view of the cover assembly along A-A of FIG. 1.

FIG. 2 shows a cross-sectional view of cover assembly 10 along A-A shown in FIG. 1. As shown in FIG. 2, front cover 16 is substantially cup shaped so as to include a first portion 40 extending radially and a second portion 42 extending axially from a radially outer end of first portion 40. Pilot 18 is welded to first portion 40 by a weld 44, In embodiment shown in FIG. 2, drive plate 14 is riveted to front cover 16 by extruding front cover 16 with such a force that each rivet 24 is formed as an extruded rivet, installing the rivet into a respective hole 46 formed in drive plate, and expanding the rivet to form a head 48. For each rivet 24, a punch may be used to extrude a portion of front cover 16, leaving an indentation 50 in an inner surface 52 of first portion 40 of front cover 16. In alternative embodiments, instead of extruded rivets, rivets 24 may be conventional, cold headed rivets.

One elastic preloading element 26 is illustrated in FIG. 2 by dotted lines, as preloading element 26 is offset from A-A in FIG. 1. As shown in FIG. 2, preloading element 26 is formed by bending tab 34 away from interior 30 of drive plate 14 so that the bent tab 34 contacts and presses against outer surface 54 of first portion 40 of front cover 16 with free end 36 of tab 34 when drive plate 14 is fixed to front cover 16. Tab 34 is compressed by the connection between drive plate 14 and front cover 16 and is urging front cover 16 away from drive plate 14.

To form cover assembly 10, elastic preloading element are formed in interior 30 of drive plate 14 by cutting slots 32 into interior 30 so as to define tabs 34. Tabs 34 are then bent axially away from interior 30. Drive plate 14 may then be fixed to outer surface 54 of front cover 16 such that elastic preloading elements 26 of drive plate 14 press against outer surface 54 and are compressed.

In alternative embodiments of the present invention, instead of being fixed together by rivets 24, drive plate 14 and front cover 16 may be welded together.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
a turbine;
an impeller;
a cover assembly comprising:
a front cover; and
a drive plate connected to an outer surface of the front cover configured for coupling the front cover to an engine crankshaft, the drive plate including elastic preloading elements pressing against the outer surface of the front cover such that the elastic preloading elements are compressed by the outer surface of the front cover, wherein each elastic preloading element is formed in an interior of the drive plate, and the elastic preloading elements are formed by tabs cut into the interior of the drive plate and bent toward the front cover; and
a rear cover connected to the front cover, the front cover and the rear cover forming a housing that houses the turbine and the impeller.

2. The torque converter as recited in claim 1 wherein the tabs extend radially in the interior of the drive plate.

3. The torque converter as recited in claim 2 wherein the drive plate includes radial protrusions on an outer circumference thereof, the tabs extending into the radial protrusions.

4. The torque converter as recited in claim 2 wherein each tab includes a base end connected to the interior and a free end radially outside the base end surrounded by slots, the free end contacting the front cover.

5. The torque converter as recited in claim 1 wherein the drive plate is connected to the front cover by rivets.

6. The torque converter as recited in claim 5 wherein the rivets are extruded from the front cover through holes in the drive plate.

7. The torque converter as recited in claim 5 wherein the elastic preloading elements are radially outside of the rivets.

8. The torque converter as recited in claim 1 wherein the drive plate is a metal plate.

9. A method for forming a cover assembly for a torque converter comprising:
fixing a drive plate to an outer surface of a front cover of the torque converter such that elastic preloading elements of the drive plate press against the outer surface and are compressed; and
forming the elastic preloading elements within an interior of the drive plate, wherein the forming the elastic preloading elements includes cutting slots in the interior of the drive plate to form tabs and bending the tabs away from the interior of the drive plate.

10. The method as recited in claim 9 wherein the drive plate includes radial protrusions at an outer circumference thereof, the slots being cut to extend into the radial protrusions.

11. The method as recited in claim 9 wherein the fixing the drive plate to the front cover includes riveting the drive plate to the front cover.

12. The method as recited in claim 11 wherein the riveting the drive plate to the front cover includes extruding the front cover through holes in the drive plate.

13. The method as recited in claim 9 wherein the slots are cut such that each tab includes a base end connected to the interior and a free end radially outside the base end surrounded by the slots, the fixing of the drive plate to the outer surface of the front cover of the torque converter including contacting the outer surface with the free ends of the tabs.

14. The method as recited in claim 9 wherein the drive plate is a metal plate.

15. A for a torque converter comprising:
a front cover; and
a drive plate connected to an outer surface of the front cover configured for coupling the front cover to an engine crankshaft, the drive plate including elastic preloading tabs pressing against the outer surface of the front cover, each elastic preloading tab being formed in an interior of the drive plate and being defined by respective slots passing through the interior of the drive plate, each elastic preloading tab including a base end connected to the interior and a free end radially outside the base end surrounded by the slots, the free end contacting the outer surface of the front cover.

* * * * *